United States Patent [19]
Camras

[11] 4,097,893
[45] Jun. 27, 1978

[54] PORTABLE VIDEO RECORDING SYSTEM EMPLOYING CAMERA AND RECORDING STATIONS CONNECTED BY WIRELESS LINKS

[75] Inventor: Marvin Camras, Glencoe, Ill.

[73] Assignee: IIT Research Institute, Chicago, Ill.

[21] Appl. No.: 718,173

[22] Filed: Aug. 27, 1976

Related U.S. Application Data

[60] Continuation-in-part of Ser. No. 488,466, Jul. 15, 1974, Pat. No. 3,984,625, which is a continuation of Ser. No. 237,220, Mar. 22, 1972, abandoned, which is a continuation of Ser. No. 889,775, Dec. 11, 1969, abandoned, which is a division of Ser. No. 545,050, Apr. 22, 1966, Pat. No. 3,484,546.

[51] Int. Cl.² ............................................. H04N 7/00
[52] U.S. Cl. ....................................... 358/83; 360/69
[58] Field of Search ................ 358/83, 4, 141; 360/69

[56] References Cited
U.S. PATENT DOCUMENTS 3,984,625   10/1976   Camras ................................. 358/83

*Primary Examiner*—Richard Murray
*Attorney, Agent, or Firm*—Hill, Gross, Simpson, Van Santen, Steadman, Chiara & Simpson

[57] ABSTRACT

A portable video recording system, particularly for amateur video reporting operations and the like, employing a camera station and a recording station which are physically separated from one another and connected over wireless links, the camera station being of a size to be readily manually carried on the person and designed merely to produce video and associated signals and transmit the same by radiation of a high frequency carrier, light or other signal to the recording station, and processed by receiving means thereat to derive the signals to be recorded, the recorder being operatively controlled from the camera station, whereby both the camera and the recorder of the remote recording station are under the control of the camera operator. Signals are also transmitted from the recording station to the camera station for indicating to the camera operator the operation of the recorder. Such indicating means may be a video monitor, an audio signal such as a tone signal, a visual signal such as an indicator light, or a combination thereof. Means also may be provided for effecting a selective switching, whereby a video signal may be returned to the camera either from the play-back head during recording operations, or from the recording head when the recording mechanism is not in operation.

29 Claims, 3 Drawing Figures

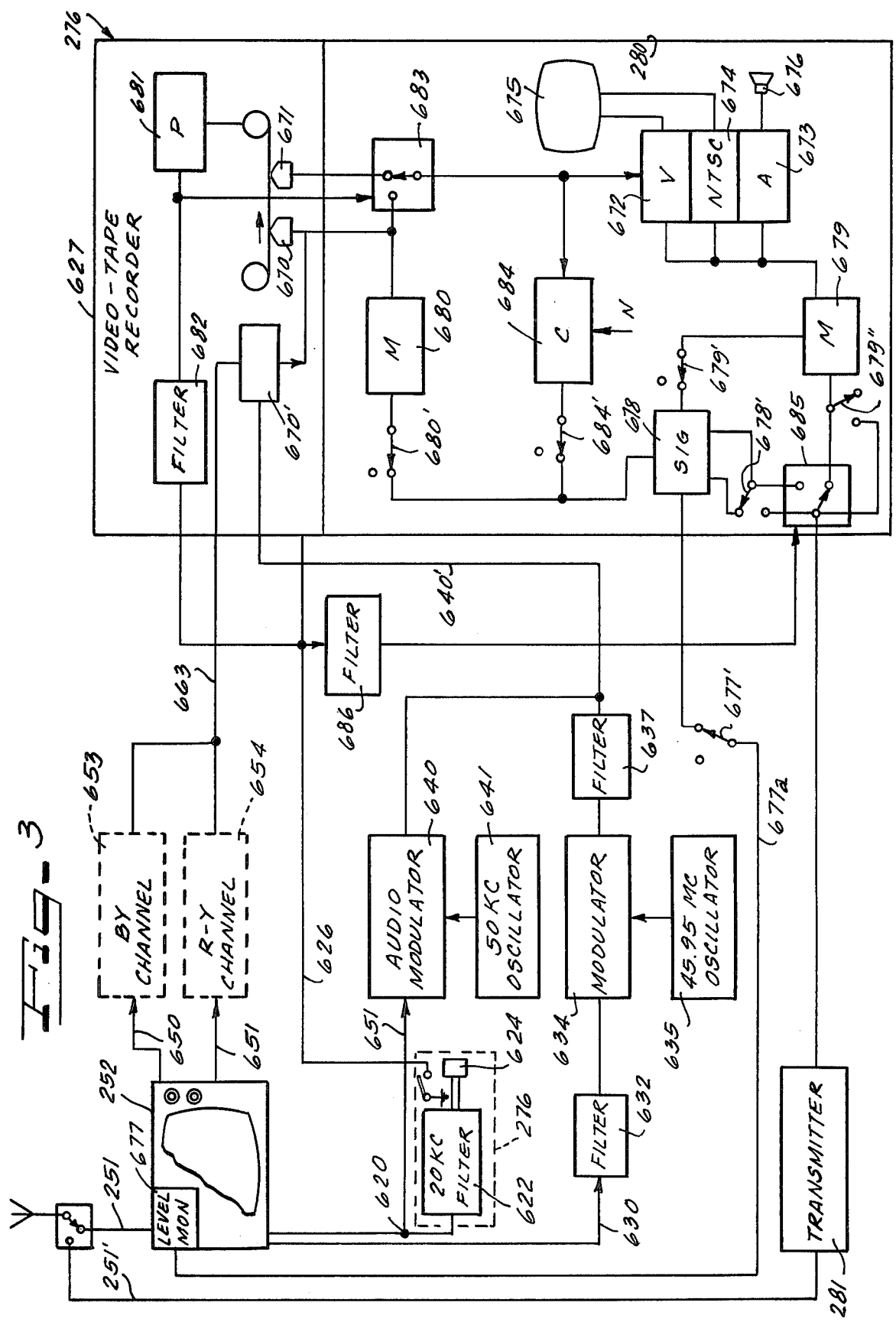

PORTABLE VIDEO RECORDING SYSTEM EMPLOYING CAMERA AND RECORDING STATIONS CONNECTED BY WIRELESS LINKS

CROSS-REFERENCES TO RELATED APPLICATIONS

The present application is a continuation-in-part of application Ser. No. 488,466, filed July 15, 1974, now U.S. Pat. No. 3,984,625, which is a continuation of application Ser. No. 237,220 filed Mar. 22, 1972, now abandoned, which was a continuation of application Ser. No. 889,775 filed Dec. 11, 1969, now abandoned which was a division of copending application Ser. No. 545,050 filed Apr. 22, 1966 now U.S. Pat. No. 3,484,546 dated Dec. 16, 1969.

SUMMARY OF THE DISCLOSURE

The invention is directed to a portable video recording system, particularly for amateur video recording operations, in which the operator is provided with an independent and self-contained video camera station which he may readily carry about without difficulty, operating the same at will, with the recording operations taking place at a recording station remote from the camera station and connected therewith only over a wireless link employing high frequency radiated signals. The arrangement is such that the recorder at the remote recording station is under the control of the camera operator whereby the recorder will be actuated only when the camera station is fully operable.

As a result of this arrangement, both the camera station and the recording station may be of optimum construction for the specific purposes involved. Thus the camera's station may be small, extremely lightweight, incorporating merely the video camera, a transmitter for transmitting signals by radiation to the recording station, and means for supplying the necessary synchronizing and control signals both for the production of the video signals at the camera and for transmission to the recorder for use thereat. All of such components may be readily miniaturized whereby the camera station, including its power supply, may, for example, take the form of a single hand held structure no larger than comparable movie cameras. Likewise, as it is unnecessary to design the recording station as a continuously manually carried portable structure, it may be appropriately designed for optimum performance, consistent with being adequately portable whereby it may be carried to a suitable location but not required to be carried continuously along with the camera.

In the system illustrated in my prior application Ser. No. 237,220, to render the camera station operable to effect a recording of pictures at the recording station, it was necessary to actuate a suitable switch on the camera whereby a start-stop signal was supplied, along with the television sound from a microphone, to the audio modulator of the camera station with the output of the modulator being connected in parallel with the output of the NTSC circuits, and thus with the output of the camera pickup tube, whereby all of such signals were supplied, along with UHF carrier, to the RF modulator, and transmitted to the recording station. Conversely, such arrangement insures that the recorder will not be operating when the camera station is inoperative.

Thus, while the recording mechanism of the arrangement of such prior application was operatively recording only when the camera was in operation, no means were provided for insuring that the recording station was properly operating, or even in operation, when the camera station was in operation. Consequently, to avoid the possibility of an undetected mechanical or electrical failure at either station or transmission failure, resulting in no recordation of the desired subject matter, means are provided for warning the camera operator thereof. Such means, in accordance with the invention may include a visual or audio signal, an actual monitoring of the recorded signals, or a combination thereof. Likewise, in addition thereto the camera operator may also be warned when camera transmission or recorder reception is inadequate for suitable recording, and, if desired, in addition to the provision of the desired warning, the camera or recorder operation may be automatically stopped in the absence of proper recording conditions at the recorder.

In a more elaborate system additional circuitry may be provided to enable the camera operator to exercise additional control functions over the base recording station, facilitating the efficient operation thereof as well as providing other advantages in flexibility of operation.

Thus, the recording mechanism, per se, may be provided with a suitable so-called "pause" control whereby the tape movement may be stopped without interrupting any of the other functions of the system. This is particularly advantageous in a system in which a monitoring picture is transmitted from the recording station to the camera station as means may be provided at the camera for effecting such a pause, and also, for example, effecting a changeover from a play-back head to the recording head of the mechanism, whereby a picture will continue to be transmitted to the camera in the absence of tape movement. The pause control may be actuated by means of a push button or the like on the camera unit, whereby suitable signal is transmitted to the base station to provide the desired actuation.

Likewise, if desired, an additional button may be provided on the camera adapted to initiate a switching over at the recording station, of transmission of a video monitoring picture to transmission merely of a signal indicating the operation is progressing satisfactorily, for example, by the illumination of a light on the camera or by a light illumination in the event operation ceases to be normal.

BRIEF DESCRIPTION OF THE DRAWINGS

In the drawing, wherein like reference characters indicate like or corresponding parts:

FIG. 3 is a diagrammatic view, generally corresponding to FIG. 21 of such patent, giving an example of receiver circuitry in accordance with the embodiment of FIG. 1.

DETAILED DESCRIPTION OF THE INVENTION

Figure 1:
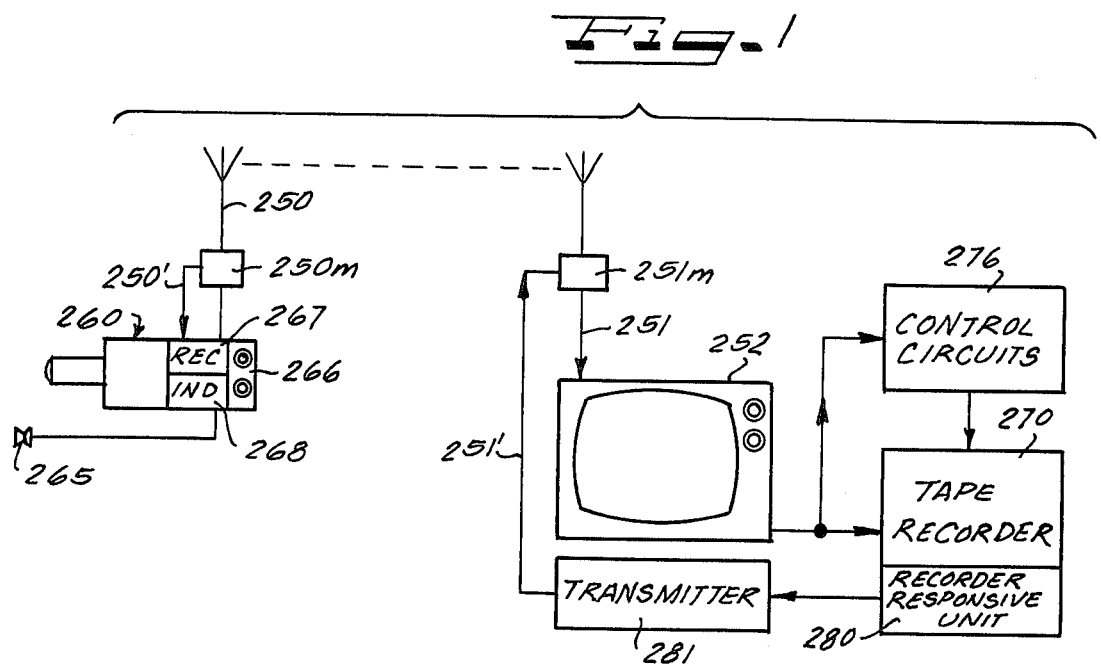
FIG. 1 generally corresponds to FIG. 10 of U.S. Pat. No. 3,484,546 and broadly illustrates a portable video recording system in accordance with the present invention.
Figure 2:
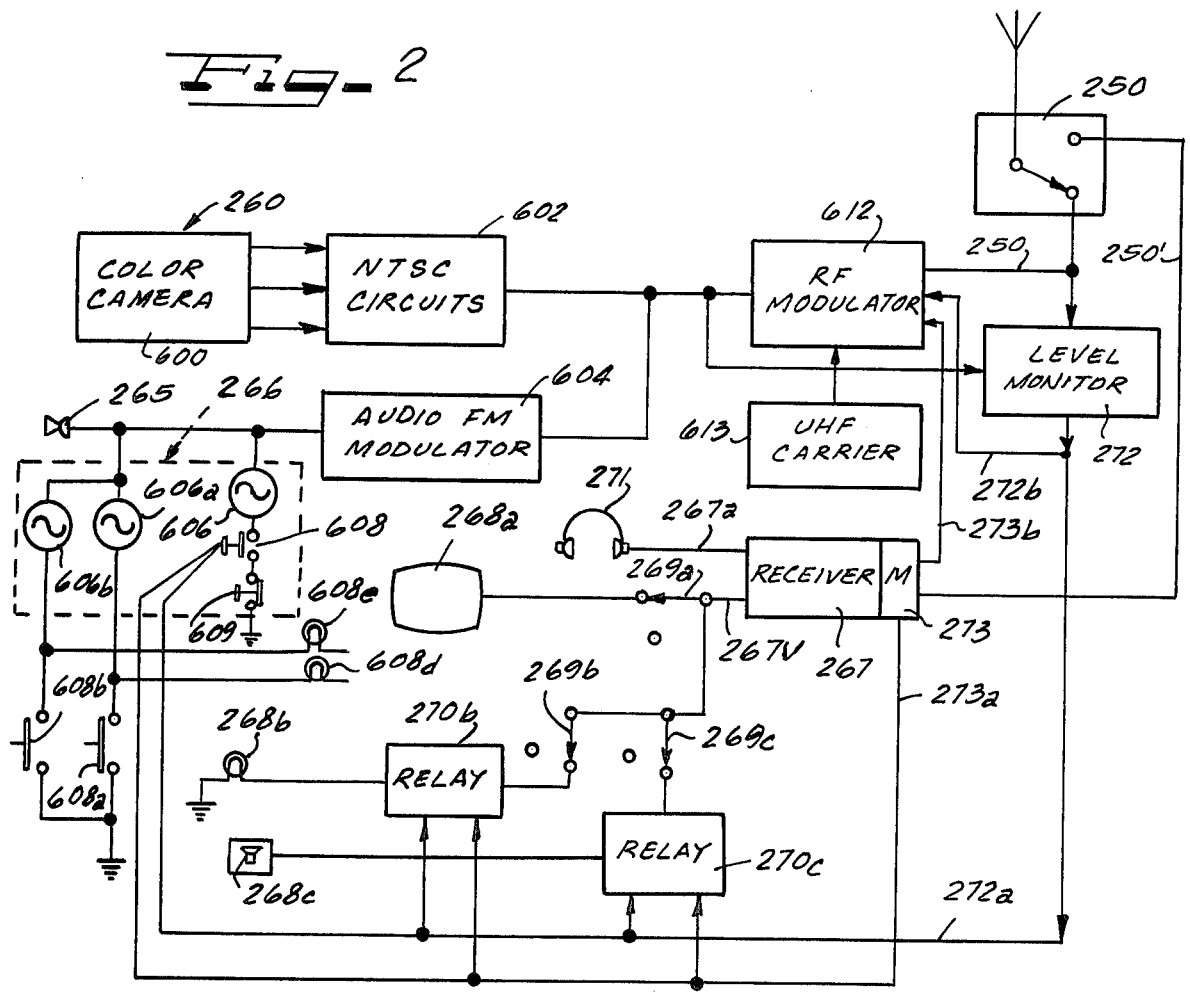
FIG. 2 is a diagrammatic view, generally corresponding to FIG. 20 of such patent, giving an example of camera circuitry in accordance with the embodiment of FIG. 1.

The present invention may employ camera and recording systems of the type illustrated in Camras U.S. Pat. No. 3,484,546, previously referred to, wherein will be found a complete description of the camera and recording systems referred to, and which patent is hereby incorporated herein by reference. FIGS. 1 to 3 of the drawings hereof, with the exception of the additions thereto of the details of the present invention, directly correspond to FIGS. 10, 20 and 21 of said patent and to FIGS. 1–3 of divisional application Ser. No. 488,466.

FIG. 1 illustrates a portable camera station, indicated generally by the reference numeral 260, hereinafter referred to generally by the term "camera," which for the purposes of explanation will be assumed to be color camera and adapted to generate a standard NTSC modulated carrier, as with conventional color camera outputs. However, transmission with any other type of standard, such as PAL, SECAM, 50 cycle, or high resolution system may be employed. The carrier output from the camera may be of a proper frequency and of low power for feeding via the antenna such as indicated at 250 in FIG. 1 to the antenna 251 of a standard NTSC color television receiver 252. The carrier may be in a VHF or UHF channel not being used by television broadcasters in the vicinity. A portable camera 260 in accordance with the present invention may be battery operated and may include a microphone 265 for sound pick-up and suitable control circuits such as indicated at 266 for controlling a color or monochrome tape recorder such as indicated at 270. Thus, the camera 260 can be quite portable, and handled in the same way as a film camera. The control signal may be transmitted by the antenna 250 on a sub-carrier or during blanking of the video signal, for example, and may be supplied to a control circuit 276 at the receiver for starting and stopping the recorder 270 and the like. The receiver and recorder may also be portable, and located nearby in an automobile or boat, or may be set on the ground or carried by a shoulder strap. The camera may include a miniature monitoring kinescope if desired.

FIG. 1 also broadly illustrates means for monitoring or supervising the recording operation to insure that all equipment is properly operating and that a recording operation is, in fact, taking place. Associated with the tape recorder 270 is a recorder-responsive unit 280 which in adapted to monitor the operation of the recording station and in particular the tape recorder, whereby the camera operator may be apprised of the proper operation of the recording station, or the existence of a malfunction somewheres in the overall system. In the event of improper or lack of a recording operation, the recorder-responsive unit produces a suitable output signal which is conducted to the transmitter 281 and transmitted to the camera 260 which, in accordance with the invention, incorporates a receiver 267 adapted to receive the signal transmitted by the transmitter 281 and under predetermined conditions to actuate suitable indicating means indicated generally by the numeral 268.

For the purposes of illustration the output of the transmitter 281 is illustrated as being connected over a line 251' to the antenna 251 and the like manner the receiver 267 as illustrated as being connected to the antenna 250 by a line 250'. It will be appreciated that separate antennas may be employed, or the same antenna may be employed with different transmission frequencies in the two transmission directions. It will also be appreciated that the transmission of the return signal from the recording station to the camera station may involve the same transmission frequency, utilizing, from a time standpoint, periods of no intelligence transmission from the camera station to the recording station, for example, blanking periods in the video transmission, or utilizing multiplexing means, schematically illustrated in FIG. 1 by the blocks 250M and 251M. Likewise, suitable traps or selective filters may be employed with each antenna to provide suitable rejection of the associated transmission at the cooperable receiver.

As herein described in greater detail in connection with FIGS. 2 and 3, the recorder-responsive unit 280 may include means for transmitting signals for operating a visual monitor screen in the camera, whereby the camera operator, not only is provided with a monitoring screen which may function as a view finder, but is also visually monitoring the video content actually recorded at the recording station. In addition to, or in lieu of such monitoring facilities, the transmitter 281 may transmit suitable signals, in response to conditions at the recording station, to actuate a visual indicator such as a warning light, an audio indicator such as a buzzer, or both to insure adequate notice to the camera operator of the failure to properly record. Such recorder-responsive unit may also include means for providing such a signal in the event the received RF signal or the video and audio signals are insufficient to provide a desired quality in the recording. Further, the camera station may also include means for monitoring the transmission of the camera station to provide a warning signal when the transmission thereat is too low to provide a recording with satisfactory quality.

Extremely high microwave frequencies, for example, in the gigahertz frequencies, may be advantageously employed for the monitoring transmissions between the base and camera stations, to afford suitable bandwidths and permitting a number of camera systems to be operated in the same vicinity. As camera-recorder distances will be short relatively low power will be required and distant interferences will be minimized.

FIG. 2 illustrates certain details relative to the embodiment of FIG. 1 and illustrates a color camera 600 which may supply component signals such as red, green and blue signals, or -Y, R-Y, and G-Y signals. These signals are supplied to conventional means 602 for composing a broadcast color television signal, for example in accordance with current U.S. broadcast or other standards. If desired the sync signals for the video signal may be supplied from the recorder, or generated locally. The audio signal from microphone 265 together with any control signal from component 266 would be supplied to an audio circuit as indicated at 604 which could comprise the standard circuits for generating a 4.5 megacycle per second audio signal in conventional color television broadcasting, By way of example, control circuit 266 is illustrated as including a source 606 of a suitable frequency such as 20,000 cycles per second or other frequency within the bandpass of the sound channel for transmission by the component 604 along with the audio signal from microphone 265. By way of example, it may be assumed that the presence of the control signal from source 606 might start a suitable color television tape recorder circuit such as indicated in FIG. 3 which tape recorder would continue to operate until the control signal from source 606 was no longer present. Thus push button 608 in FIG. 2 could represent a start button for initiating operation of a remote tape recorder, for example the button 608 being latched in its closed position until a stop button 609 is depressed.

Depressing of the stop button 609 momentarily may serve to unlatch the start button 608 returning it to the position shown in FIG. 2, the stop button 609 being spring urged to its closed condition so as to return to the closed condition after manual actuation to stop operation of the remote tape recorder. Components 612 and 613 may represent conventional circuitry for transmitting a color television broadcast signal on a suitable frequency such as an ultra high frequency. The radiated power may, of course, be just sufficient to carry the signal to the desired receiving station such as indicated at 252 in FIGS. 1 and 2. Alternatively, the carrier frequency source 612 may operate at a frequency corresponding to one of the very high frequency television channels which is not being utilized in the vicinity of the camera circuitry 260.

As illustrated in FIG. 2 the receiver 267 is provided with an output 267V for video signals which, in the embodiment illustrated, is adapted to actuate a video monitoring tube 268a, an indicator light 268b or an audio generating device 268c with the selection in the embodiment illustrated being effected by manual selector switches 269a, 269b or 269c. The indicator lamp 268b is adapted to be controlled by suitable means such as a relay 270b which is adapted to be connected over the switch 269b to the video output and operable in response to the presence of a predetermined received signal operative over line 272b. In like manner the audio device 268c may be actuated over a suitable relay 270c, likewise adapted to be actuated by a predetermined received signal over line 270b.

Provision may also be made for a head set 271 connected to audio output 267A by means of which the audio signals may be monitored by the camera operator.

In addition, if desired there may be provided a low level control 272 which, as illustrated, may be connected, over line 272b, to monitor the output of the RF modulator 612 or the input modulation signal thereto, or both, with the low level control being operable to suitably actuate the light 268b or the audio device 268c, to provide the desired warning indication to the camera operator or may be suitably interlocked, over line 272a, with the camera control switches, for example the switch 608, to render the camera inoperative under such conditions. If desired a combination of such indicators may be employed.

In like manner the receiver 267 may include monitoring means 273, schematically illustrated as forming a part of the RF circuit, for monitoring the signal strength of the received signal from the recorder, operatively connected over line 273a to relays 270b or 279c, or both to correspondingly actuate the associated indicator means. If desired the line 273a as schematically illustrated may be connected, over a suitable solenoid or other means, to the actuating switch 608 to stop the camera operation under predetermined conditions.

The camera station is also illustrated in FIG. 2 as being provided with signal generating means 606a and 606b, respectively adapted to be actuated by switches 608a and 608b. If desired respective indicator lights 608d and 608e may also be provided to indicate actuation of the respective switches 608a or 608b. Switches 608a and 608b together with the associated signal generators are operative to selectively transmit a suitable tone or other signal to the receiving station for effecting predetermined operation of the system thereat as will be more fully described in connection therewith the recording station.

It will be appreciated that all of the indicating lamps or members may be of suitable low-drain design, as for example LED elements.

FIG. 3 is also related to FIG. 1 and illustrates a specific receiver arrangement for the camera 260 including the television receiver 252. In the illustrated embodiment, the control signal generated by source 606 in FIG. 2 is shown as being removed by means of a conductor 620 which could be connected to the sound demodulator circuit of the television receiver 252. The demodulated sound and control signal is shown as being supplied by conductor 620 to a filter 622 designed to block the sound signal while transmitting the control frequency to a relay 624. Thus so long as the control button 608 of FIG. 2 is depressed, relay 624 will be held energized and ground will be applied to a conductor 626 leading to a video tape recorder component 627. By way of example, applying ground to conductor 626 may cause the actuation of a relay associated with component 627 which places the video tape recorder 627 into operation. Suitable video tape transports are illustrated in my copending applications Ser. No. 401,832 filed Oct. 6, 1964, Ser. No. 456,192 filed May 17, 1965 and Ser. No. 493,271 filed Oct. 5, 1965. An illustrative color television recording system is disclosed in my copending application Ser. No. 528,934 filed Feb. 21, 1966, for example.

As schematically illustrated in FIG. 3, assuming a video recording mechanism of the tape type, the videotape recorder 627 may include a recording head 670 and a monitoring head 671, adapted to be actuated by the information recorded by the head 670 on the recording tape. Signals supplied on lines 640' and 663 to the recorder, for example, to a mixing stage 670', and the video and audio signals supplied to the head 670. The signals taken off at the head 671 may be conducted to suitable video, audio and NTSC or other comparable circuits to provide a complete television signal. As illustrated, the video output from the video circuits 672 and the output from the NTSC circuits 674, if desired, may be conducted to a monitoring tube 675 for providing a visual indication of the recording operation at the recording station and in like manner the audio unit 673 may be provided with suitable means such as a speaker 676 for the audio output of the unit 673.

The video television signal thus provided may be conducted to the transmitter 281 and thus transmitted to the camera 260. In addition, there may also be provided means for monitoring the RF signal level received at the recording station as well as the signals to be recorded, to provide desired warning signals to the camera operator. Thus, as schematically illustrated in FIG. 3, the receiver 252 may be provided with suitable means 677 for monitoring the signal strength of the received transmission from the camera (by means of any suitable representative AGC or other value) with the output of such monitoring means being conducted over line 677a, to a suitable signal producing means 678. The latter is operable to provide an output signal which may be conducted to the transmitter 281 and transmitted to the camera 260 and, following processing by the receiver 267, adapted to actuate the associated indicating or other means, such as the lamp 268b or the audio device 268c.

As illustrated, the signal device 678 may also be connected to a monitoring means 680, adapted to receive the signals to be recorded, for example, from the recording head 670 for actuation thereby in the event the recording level falls below a predetermined minimum suitable for satisfactory recording, whereby the signal device 678 will in such case provide a warning signal which likewise is conducted to the transmitter 281.

As previously described with respect to the camera station, automatic control of the transmission output thereof may be provided and the signal device 678 may be designed to provide a representative signal for control of the level control 273 of the camera station, adapted, for example to regulate the transmission output or the modulation, as indicated by the line 273b.

The recorder 627 may be provided with a suitable pause control mechanism 681, of known type, adapted when actuated to suitably disengage the recording tape from the drive spindle to stop tape movement, while permitting the remainder of the recording station to operate. The pause control 681 in the embodiment illustrated is adapted to be actuated by a signal from the camera station, for example, when the switch 608a of the latter is closed to actuate the signal generator 606a, with the received signal being conducted, for example, over a suitable filter 682 to the pause control 681. In the embodiment illustrated, the output from the filter 682 also may be conducted to a switching mechanism 683 which is adapted to selectively connect the input of the units 672, 673 and 674 to the play-back head 671, or to the output of the recording head 670, whereby the output of the play-back head 671 will normally be supplied when the tape of the recorder is moving, or signals from the recording head 670 will be supplied when the tape is stationary, so that a picture signal will be transmitted irrespective of whether the tape is moving or not.

The signal input to the units 672, 673 and 674 from the playback head 671 or from the recording head 670, in dependence upon the setting of the switch 683, may be conducted to the first input of a comparator 684, with the second input thereof being supplied with a normal or optimum recording value N, whereby a signal will appear at its output in the input signal differs from the optimum value by a predetermined amount, which output signal may be conducted to the signal producing means 678. As illustrated, the output of the monitoring means 677, 679, 670, as well as the output of the comparator 684 may all be conducted to the signal producing means 678 over corresponding switches 677', 679', 680' and 678' whereby any one or combination of such monitoring and comparator means may be operatively connected to the signal producing means 678.

The outputs of the monitoring means 679 and/or signal producing means 678 may be operatively connected to the transmitter 281 by a suitable electronic switch 685 or the like, adapted in the embodiment illustrated, to be actuated by a signal from the camera transmitter, which following its reception at the recording station is conducted, for example, over a suitable filter 686 to the switch 685 to actuate the same. As illustrated the switch 685 is adapted to connect the input of transmitter 281 to the output of either the signal producing means 678 or the monitoring means 679. The switch 608b, at the camera station, when actuated to operate the signal generator 606b is adapted to provide a signal which will be passed by the filter 686 to enable actuation of the switch 685. Thus, button 608b on the transmitter may be employed to determine the connection of either the signal producing means 678 or monitoring means 679 to the transmitter. Additional switches 678' and 679" may be provided whereby either the signal producing means 678 or the monitoring means 679 may be connected to the transmitter 281 independently of the particular actuation of the switch 685.

The provision of the switch 685 and actuating switch 608b therefor, enables, for example, the operator to employ a video transmission from the recorder to the camera during initial setting up of the camera, i.e., preliminary operation such as focusing, adjustment of light levels, etc. Under such conditions the pause control likewise may be actuated by means of the button 608a to prevent tape movement and at the same time switching the input of the units 672, 673 and 674 from the playback head to the recording head may take place whereby the received picture at the recording station will be retransmitted to the camera station without recording. When the initial adjustments are completed, the switch 608b may be suitably actuated to switch the input of the transmitter 281 from the monitoring means 679 to the output of the signal producing means 678, with the latter being adapted to be actuated by any of the individual monitoring or comparator means during the remainder of the recording operation. It will be appreciated that under these circumstances a considerable savings both in power and in transmission band requirements is achieved as a result of the relatively very narrow band required for indicating signals as compared with that required for transmission of a monitoring video signal.

It will be appreciated that while I have illustrated a number of different arrangements for providing a monitoring function of the recorder operation, any one or all of the same may be employed, in dependence on cost, size, transmission power and similar factors, as well as the available power source that may be employed.

Likewise, it will be appreciated that the inclusion or exclusion of any of the particular signal means will depend to some extent on the cost factors involved and the particular price range in which the equipment is to fall. Thus, relative low cost equipment may employ merely an indicator light or an audio indicator at the camera, with the operation being solely dependent upon received warning signals from the recording station, while in more elaborate equipment the video monitoring tube may be included, as well as visual and audio monitoring equipment at the recorder.

It will also be appreciated that the invention can be practiced utilizing other than high frequency radio waves, for example, modulated infra red or light radiation.

Likewise, it will be apparent that the recorder may be of any suitable type employing any suitable recording medium.

It will be apparent that many modifications and variations may be effected without departing from the scope of the novel concepts of the present invention.

I claim as my invention:

1. A portable video recording system, particularly for amateur video recording operations and the like, comprising a video recording station, and an independent, self-contained and self-powered portable video camera station, the latter being of a size to be readily manually carried on the person and comprising a video camera, a transmitter operatively connected to said camera, for transmitting the output signals of said video camera by transmission of a high-frequency carrier signal, means for forming recorder start-stop signals, means on the camera for controlling the transmission of recorder start-stop signals from the transmitter, receiver means forming a part of said camera station, for receiving signals transmitted from such a recording station and representing a predetermined operating condition of said recorder, and indicating means to which the output of the receiver means is supplied for control of said indicating means, to provide a desired indication to the camera operator of the operation of the recorder; said recording station comprising video recording means, means for receiving transmitted signals from said camera station and supplying the received output signals of said video camera, together with synchronizing control signals, to said video recording means, means for controlling the start-stop operation of said recording means, means operatively connected to said recorder receiving means and to said recorder-controlling means, responsive to recorder start-stop signals from said camera station received by said receiving means, means disposed to effect a monitoring operation of television signals received from said camera station, operative to provide a signal indicative of a predetermined condition in said received signals, and transmitter means forming a part of said recording station for transmitting said indicative signals from the recording station to said camera station.

2. A video recording system according to claim 1, comprising in further combination, means forming a part of said camera station for monitoring the signal level of television signals generated thereat and means connected to said monitoring means operative in the presence of predetermined conditions of said television signals, for providing a predetermined indication to the camera operator of such conditions.

3. A video recording system according to claim 2, wherein the monitoring means at said recording station includes means for generating a signal in response to the existence of predetermined operating conditions at the recording station, in the absence of which condition such a signal is not transmitted.

4. A video recording system according to claim 1, wherein the indicating means of said camera station is a light-emitting element, providing a visual indication to the camera operator.

5. A video recording system according to claim 1, wherein said indicating means of said camera station is a sound-emitting element, providing an audio indication to the camera operator.

6. A video recording system according to claim 1, wherein the receiver of said camera station is a television receiver including a monitoring video tube, for receiving and reproducing television signals received from said recording station.

7. A video recording system according to claim 6, wherein the monitoring means at said recording station includes a play-back unit for taking television signals from the recording medium following recording thereon, and means for supplying such signals to said transmitter for transmission of television signals to said camera station.

8. A portable video camera station, for use with a cooperable video recording station connected therewith by only wireless links and adapted to receive, process and record radiated signals from such camera station, and including start-stop means controlling the recording operation under control of the camera station, particularly for amateur video recording operations and the like, in the form of an independent, self-contained portable video camera station, of a size to be readily manually carried on the person and comprising a video camera, a transmitter operatively connected to said camera for transmitting signals therefrom by transmission of a high-frequency carrier signal, means for forming recorder start-stop signals, and means on said camera for controlling the transmission of recorder start-stop signals from said transmitter, for controlling the start-stop control means at such a recording station, receiver means forming a part of said camera station, for receiving signals transmitted from such a recording station and representing a predetermined operating condition of the recorder thereat, and indicating means to which the output of said receiver means is supplied for control of said indicating means, to provide a desired indication to the camera operator of the operation of the recorder.

9. A portable video camera station according to claim 8, wherein said monitoring means is disposed to monitor the video signals supplied to said transmitter.

10. A portable video camera station according to claim 8, wherein said indicating means comprises a light-emitting element, providing a visual indication to the camera operator.

11. A portable video camera station according to claim 8, wherein said indicating means comprises a sound-emitting element, providing an audio indication to the camera operator.

12. A portable video camera station according to claim 8, wherein said indicating means comprises means operatively connected with control elements of the camera station for interrupting the operation thereof under predetermined conditions.

13. A portable video recording station, for use with and control by a cooperable portable video camera station connected therewith by only wireless links and adapted to produce video and control signals and transmit the same to the recording station for use in recording thereat, particularly for amateur video recording operations and the like, comprising video recording means, means for receiving transmitted signals from such a camera station, and supplying the received video signals to said recording means, means for controlling the start-stop operation of said recording means, means operatively connected to said receiving means and to said recorder-controlling means, responsive to start-stop signals from such a camera station, received by said receiving means, for controlling said start-stop control means, whereby the recorder start-stop operation is controlled by such a camera station, means disposed to effect a monitoring operation of television signals received from such a camera station, operative to provide a signal indicative of a predetermined condition in said received signals, transmitter means forming a part of said recording station for transmitting said indicative signals from the recording station to such a camera station, and means for supplying power to said recording station.

14. A video recording station according to claim 13, wherein said monitoring means includes a play-back unit for taking television signals from the recording medium following recording thereon, and means for supplying such signals to said transmitter for transmission of television signals to such a camera station.

15. A video recording station according to claim 13, wherein said monitoring means includes means for generating a signal in response to the existence of predetermined operating conditions at the recording station, in the absence of which condition such a signal is not transmitted.

16. A video recording station according to claim 13, wherein said monitoring means receives and is responsive to conditions in the television signal supplied to the recording unit of the recorder.

17. A video recording station according to claim 16, wherein said monitoring means is adapted to monitor the signal strength of the television signals received from such a camera station.

18. A portable video camera station, for use with a cooperable video recording station connected therewith by only wireless links and adapted to receive, process and record radiated signals from such camera station, and including start-stop means controlling the recording operation under control of the camera station, particularly for amateur video recording operations and the like, in the form of an independent, self-contained portable video camera station, of a size to be readily manually carried on the person and comprising a video camera, a transmitter operatively connected to said camera for transmitting signal therefrom by transmission of a high-frequency carrier signal, means for forming recorder start-stop signals, and means on said camera for controlling the transmission of recorder start-stop signals from said transmitter, for controlling the start-stop control means at such a recording station, means forming a part of said camera station for monitoring the signal level of television signals generated thereat and means connected to said monitoring means operative in the presence of predetermined conditions of said television signals, for providing a predetermined indication to the camera operator of such conditions, and power supply means for said camera station.

19. A portable video camera station according to claim 18, wherein said indicating means comprises a television tube to which video signals derived from the video camera whereby the video tube forms an electronic view finder for the camera station.

20. A portable video camera station according to claim 18, wherein said monitoring means comprises means for monitoring the signal level of television signals generated at said camera and means connected to said monitoring means operative in the presence of predetermined conditions of said television signals, for providing a predetermined indication to the camera operator of such conditions.

21. A portable video camera station according to claim 20, wherein said monitoring means is disposed to monitor the signal level of the high frequency carrier transmission.

22. A portable video camera station according to claim 20, wherein said monitoring means is disposed to monitor the television signals supplied to said transmitter.

23. A portable video camera station according to claim 20, wherein said indicating means comprises a light-emitting element, providing a visual indication to the camera operator.

24. A portable video station according to claim 20, wherein said indicating means comprises a sound-emitting element, providing an audio indication to the camera operator.

25. A portable video camera station according to claim 20, wherein said indicating means comprises means operatively connected with control elements of the camera station for interrupting the operation thereof under predetermined conditions.

26. A portable video camera station according to claim 18, wherein said indicating means is a light-emitting element, providing a visual indication to the camera operator.

27. A portable video camera station according to claim 18, wherein said indicating means is a sound-emitting element, providing an audio indication to the camera operator.

28. A portable video camera station according to claim 18, wherein said receiver is a television receiver including a monitoring video tube, for receiving and reproducing television signals received from such a recording station.

29. A portable video camera station according to claim 28, wherein said television receiver is adapted to receive television signals taken from the recording medium following the recording operation at such a recording station, whereby the video tube forms an electronic view finder for the camera station.

* * * * *